(12) United States Patent
Schade

(10) Patent No.: US 6,361,701 B1
(45) Date of Patent: *Mar. 26, 2002

(54) METHOD AND DEVICE FOR CONTINUOUS FILTRATION OF LIQUIDS

(76) Inventor: Horst Schade, In der Marpe 16, D-45525 Hattingen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,503
(22) PCT Filed: Dec. 23, 1996
(86) PCT No.: PCT/EP96/05820
§ 371 Date: Jun. 22, 1999
§ 102(e) Date: Jun. 22, 1999
(87) PCT Pub. No.: WO98/28058
PCT Pub. Date: Jul. 2, 1998

(51) Int. Cl.[7] .................. B01D 24/30; B01D 24/28; C02F 3/08
(52) U.S. Cl. ............ 210/786; 210/787; 210/792; 210/793; 210/807; 210/268; 210/269; 210/279
(58) Field of Search ............... 210/786, 792, 210/793, 794, 807, 189, 268, 269, 279, 787

(56) References Cited

U.S. PATENT DOCUMENTS 5,454,959 A 10/1995 Stevens
5,462,654 A 10/1995 Hering

FOREIGN PATENT DOCUMENTS

| DE | 19 32 221 | 1/1971 |
| EP | 0 128 234 | 11/1987 |
| EP | 0 291 538 | 11/1990 |
| FR | 2 030 013 | 9/1969 |

Primary Examiner—David A. Reifsnyder
(74) Attorney, Agent, or Firm—Collard & Roe, P.C.

(57) ABSTRACT

The invention relates to a method and device for the continuous filtration of liquids containing solid matter, in particular for cleaning wastewater, by means of a filter bed consisting of a particulate filtering medium, which is continuously moved through a vertically positioned cylindrical annular space (2) through which the liquid to be filtered continuously flows radially from the interior to the exterior. The particulate filtering medium containing the separated solid matter is continuously tapped from the lower end of the annular space (2), transported to the top, freed of the filtered solid matter and fed back into the annular space (2) at its upper end. With this kind of method and device, to be able to prevent in a better and more simple manner blockages caused by the separated floc of solid matter, the invention provides that as particulate filtering medium a particle mixture is used with a particle-size range comprising two or more particle sizes, ranging from coarse (2.5 mm) to fine (0.4 mm) and that this particle mixture is classified and distributed before or during feedback into the annular space (2) in such a way that the particle size in the load of the filter bed becomes smaller in a radial direction moving from the inside to the outside.

7 Claims, 7 Drawing Sheets

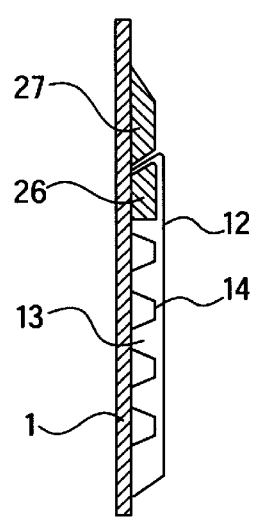
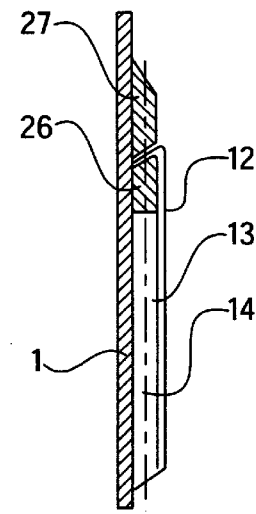
FIG. 2  FIG. 4
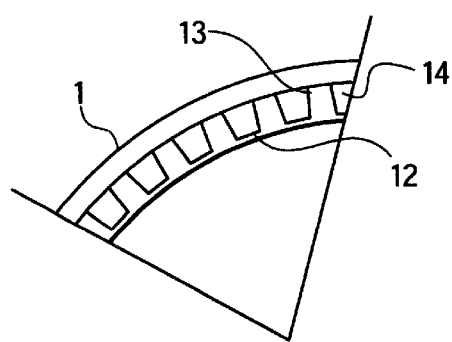
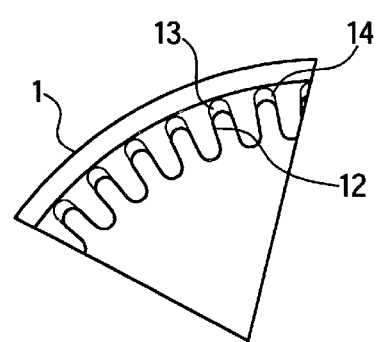
FIG. 3  FIG. 5

METHOD AND DEVICE FOR CONTINUOUS FILTRATION OF LIQUIDS

The present invention pertains to a method for the continuous filtration of fluids containing solids, in particular the treatment of waste water, by means of a filter bed, consisting of granular filter media which is moved continuously through a vertically oriented cylindrical, annular space (2), through which the fluid to be filtered flows continuously in a radial direction, whereby the granular filter media containing the retained solids is withdrawn continuously at the bottom of said annular space, transported to the top of the filter, cleaned from the filtered solids, and then returned back to the annular space at its upper end, whereby:

a granular filter media having two or more particle size distributions, ranging from coarse to fine, is being used, and this granular media is being classified before and during its introduction to the annular space in such a way that the particle sizes in the fill material of the filter bed decrease in the flow direction of the fluid to be filtered.

In methods of the prior art (see hereto DE-C-329 176, DE-A-1 932 221, or EP-B-0 128 234), it is typical that the fluid to be filtered flows through the annular space containing the filter bed in a radial direction from the outside to the inside, and the grain sizes of the filter media decrease from the outside to the inside.

A problem with such filter methods consists in the fact that the fluids to be filtered often contain solid particles in form of flocs, which can clog the pores between the granular media rather quickly due to the low flow velocities. The danger for such clogging exists primarily in the filter bed near the fluid inflow area (surface filtration).

Such clogging even takes place when the grain size of the filter media is larger in the entry zone to the filter than in the exit zone.

To counter such clogging by solid flocs, it is known in the art (see hereto EP 0291 538B) that a fine mesh screen can be provided before the fluid entry point which retains the flocs. The disadvantage is that this mesh screen must be cleaned from the deposited material in regular intervals, which requires considerable cleaning efforts.

It is the objective of the present invention to develop the method described above further, such that fluids containing solid flocs can be filtered more readily. In particular, clogging through the deposition of separated solid flocs shall be avoided by better and simpler means. At the same time, a continuous withdrawal means for the separated solid flocs is provided.

To solve this task, the present invention proposes, based on the method referenced above, to decrease the grain sizes in the fill in the filter bed in radial direction from the inside to the outside, and also to pass the fluid to be filtered through the filter bed in a radial direction from the inside to the outside with a resulting decrease of the flow velocity.

Surprisingly, it has been found that by reversing the flow direction, as proposed in the present invention, the clogging described above can be completely avoided. For the first time, in the present invention due consideration is given to the significant changes in velocities for a radial flow through a cylindrical annular space. In a radial flow through a cylindrical annular space, the velocity decreases significantly along the flow path in a greater than proportional way from the inside to the outside, because of the geometric conditions. In the method of the present invention, the flow velocity of the fluid to be filtered is highest in the entry zone to the filter bed, which is where the coarse granular material is located. As a result we find a deep filtration in this zone, whereby the entrained solid flocs are transported deep into the filter bed, which can accept much greater quantities of flocculated solids until it clogs. During the subsequent separation of the finer waste particles from the fluid to be filtered in the area of finer grained filter media, the flow velocity is significantly reduced, which allows for the finer waste particles to deposit on the fine-grained filter media. As a result, the risk of clogging is almost completely eliminated using the method of the present invention, and the efficiency of the filter plant is significantly improved.

A useful further development in the method of the present invention intends to have the fluid to be filtered undergo, in the area of the outer wall of the annular space containing the filter bed, an additional filtration through a fine-meshed sieve or through filter nozzles. This additional filtration step at the end of the flow path of the fluid to be filtered reliably retains the fine grained filter media and also offers a high flow resistance, such that a pressure gradient in the filter bed develops, which contributes to even out the flow pattern in the filter bed in the axial direction.

Furthermore, it is planned to separate all larger and heavier solid particles from the fluid to be filtered by passing the influent through a deflection chamber, where an 180° reversal takes place. This very simple and very effective pre-separation means for larger and heavier particles also reduces the amount of solid particles entering the filter media and thus the risk of clogging.

A further object of the invention is to provide a means to filter continuously fluids laden with solids in order to implement the above method having the following characteristics:

a cylindrical container having a vertically oriented cylindrical annular space containing the granular filter media, and having inner and outer walls which are permeable for fluids, a withdrawal means, located at the lower end of the annular space containing the granular media loaded with solids, an airlift whose central pipe extends from the withdrawal means to the upper end of the annular space, a cleaning means for the granular filter media, located between the top discharge point of the airlift pipe and the upper end of the annular space, an adding means, located between the cleaning means and the upper end of the annular space, in order to return the cleaned granular filter media back to the annular space in the vicinity of its outer wall, a conduit for the fluid to be filtered, located between the permeable inner wall and the airlift pipe, having at its upper end a connection for the fluid to be filtered, and being in connection at its lower end with a deflection chamber, in which the fluid to be filtered is reversed from a descending into a rising flow direction, and being directed into the annular gap formed by the conduit and the permeable inner wall, whereby the deflection chamber is equipped with a sludge withdrawal means which is in connection with the suction head of the airlift.

The sludge settling out in the deflection chamber is added in the conical area outside the filter zone to the airlift, and thus does not increase the loading on the filter bed. Further advantages result from the initially descending flow direction of the fluid to be filtered, the reversal into a rising flow direction and the inflow into the filter bed out of the rising flow direction. When taking the fluid to be filtered out of a rising flow, more solids are being introduced into the lower portion, i.e. the area where the granular filter media is soon to be withdrawn anyway, than in the upper portion. This is due to the fact that in the rising flow a certain de-mixing of the fluid to be filtered takes place.

Furthermore, it is intended to cover the permeable outer wall of the receiving space on its inner side with a micro filtration cloth, which rests upon a support structure with drainage channels. This micro filtration cloth is being cleaned continuously at its inner surface through the continuously descending filter bed. This cleaning can be intensified through hydraulic surges; such surges provide a short-term flow reversal through the micro filtration cloth. The support structure, upon which the micro filtration cloth rests, guarantees that the filtrate behind the filter cloth can be removed continuously and without any problems. This support structure can be in the form of corrugated metal or have similar drainage properties, for example, in the form of egg cartons or mushrooms.

In addition, the form of the drainage support allows to increase the area of the micro filter cloth. A level controlled discharge valve is compensating the increase in pressure drop due to the micro filter cloth. This level controlled discharge valve regulates the discharge in such a way that behind the micro filter cloth on the filtrate side (clean water side) a negative pressure of up to 9.5 m WC (13.7 psig) is generated, but without causing a negative pressure in the filter bed.

Alternatively, the permeable outer wall can also be equipped with filter nozzles having micro slits in a star-shaped arrangement inside wall openings. Also the micro slits of these filter nozzles are continuously kept free from contaminants due to the moving granular filter media. The filter nozzles have an excellent service life.

Finally, it is planned to design the cleaning means as a hydraulic classifier with a steady water inflow, and equipped with a fine bubble aeration system. In this hydraulic classifier the generally lighter settled out solids are separated from the heavier granular particles of the filter media and transported upstream. The fine bubble aeration is effected by means of a porous membrane located near the bottom of the hydraulic classifier. The rising air bubbles activate and intensify the cleaning process, which reduces the required amount of water by about half.

Exemplified embodiments of the invention are explained in greater detail in the following with the help of the drawings, in which:

FIG. 2 is a longitudinal section through a part zone of the outer wall in a first embodiment.

FIG. 3 shows a cross section relating to FIG. 2.

FIG. 4 is a longitudinal section through a part zone of the outer wall in a second embodiment.

FIG. 5 is a cross section relating to FIG. 4.

Figure 1:
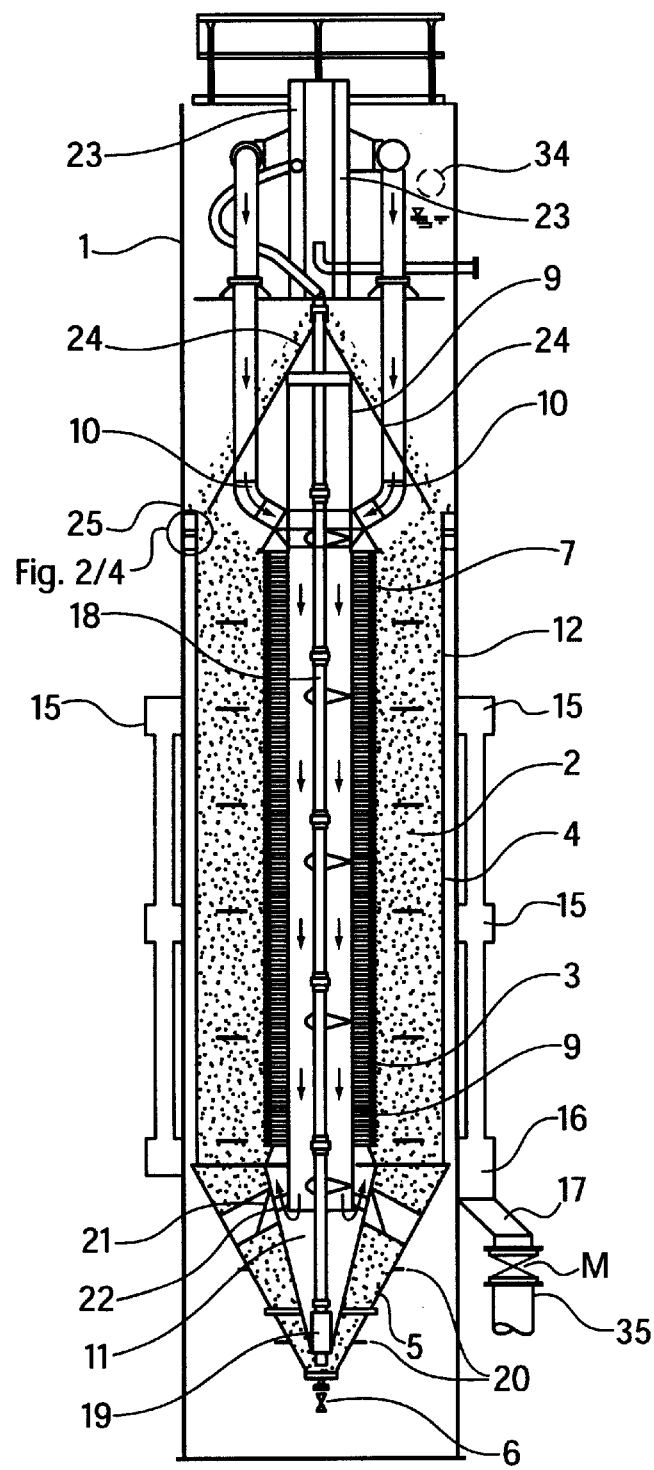
FIG. 1 shows a schematic view of a longitudinal section through a filter installation according to the invention.

The filter installation shown in FIG. 1 has a cylindrical vessel denoted in its entirety by reference numeral 1. Vessel 1 surrounds a cylindrical annular space 2 which is filled with a granular filtering material, for example sand. Annular space 2 is limited by an inner wall 3, which is permeable to liquid, and by an outer wall 4, which is permeable to liquid as well. At the bottom, the annular space 2 is adjoined by a funnel-shaped terminating space 5, which is provided at its lower end with a drain valve 6.

The inner wall 3 of annular space 2, said inner wall being permeable to liquid, consists of annular lamellae 7, which are stacked one on top of the other in the form of a column, and which are inclined downwardly on their outer circumference, leaving the radial passage gaps 8 free between each other. The annular lamellae 7 surround a baffle tube 9 with a spacing in between, said tube having a connection 10 at its upper end for the liquid to be filtered, and which is connected at its lower end with a reversing space 11, which is designed in the form of a funnel as well and which is arranged within the funnel-shaped terminating space 5 of annular space 2.

As indicated by arrows in the drawing, the liquid to be filtered is admitted into baffle tube 9 from the top via connection 10, reversed at the bottom end of baffle tube 9 in reversing space 11 by 180 degrees, and subsequently rises in the annular space between baffle tube 9 and annular lamellae 7 to the top, and then from there received via passage slits 8 between annular lamellae 7 in the sand-filled cylindrical annular space 2, with uniform distribution over the height of said annular space 2.

The outer wall 4 of the cylindrical annular space 2, said outer wall being permeable to liquid, is covered on its inner side by a fine screen fabric 12, for example a microfilter cloth, which rests on a support structure 14 provided with drainage ducts 13. Said support structure 14 has a corrugated shape or has regular projections and recesses in the way of an egg carton and in this way forms a uniform support for microfilter cloth 12. Due to the corrugated or otherwise spatially distorted arrangement of microfilter cloth 12, the latter is provided with a distinctly larger surface and thus filter surface area than when installed with a smooth cylindrical surface. The filtrate (clean water) can flow off without obstruction via the drainage ducts 13. Ring-shaped collecting conduits or filtrate collecting chambers 15 are arranged on the outside on outer wall 4 of annular space 2, said conduits or chambers being connected with the drainage ducts 13 and being connected via vertically extending tubes 16. The lowermost collecting conduit 15 is connected with a drain conduit 17 for the filtrate. Furthermore, a level sensor 34 is associated with the cylindrical vessel 1, said level sensor, in cooperation with a drain control valve 35 arranged in the lower drain conduit 17, maintaining an adequately high pressure difference on microfilter cloth 12. The control valve installed in the lower drain conduit 17 permits generation of a vacuum of maximally 9.5 m water column on the filtrate side (clean water side) downstream of the microfilter cloth.

The delivery tube 18 of a mammoth pump extends along the center of baffle tube 9. The particulate filtering material, i.e. the sand present in annular space 2, and the filtered-off solids are jointly aspirated at the lower end of the funnel-shaped terminating space 5, so that said particulate filtering medium can be admitted again into annular space 2 from the top after it has been cleaned of the filtered-off solids. At its lower end, delivery tube 18 of the mammoth pump has a suction head 19, in the zone of which the compressed air required for the operation of the mammoth pump is admitted as well. In order to promote the feed of the sand/solids mixture to suction head 19 of the mammoth pump, the flushing nozzles 20 are arranged in the wall of the funnel-shaped terminating space 5, said flushing nozzles being arranged and acted upon by water in such a way that the particulate filtering material is fluidized within the terminating space 5. Furthermore, a baffle ring 21 which is conically widening from the top downwardly is present in terminating space 5, said ring being arranged on the outer circumference of the reversing space 11 present in terminating space 5. A sludge discharge 22 of reversing space 11 is located below said baffle ring 21. The solids already separated in reversing space 11 due to the 180-degree reversal are admitted as sludge into terminating space 5 via said sludge discharge 22. Together with the filtering material and the filtered-off solids, said sludge is continuously discharged by means of the mammoth pump.

An upstream classifier 23 is arranged at the upper end of the filtration plant. The mixture of particulate filtering material, filtered-off solids and sludge aspirated by the mammoth pump is continuously transported from the sludge discharge 22 and admitted into reversing chamber 11 from the top and sorted countercurrently. In this process, the specifically lighter sludge components and the fine solid particles are discharged from upstream classifier 23 upwardly via an overflow. On the other hand, the specifically heavier particulate filtering material cleaned in this way is conveyed back into annular space 2 in order to pass through the cycle again.

The cleaned particulate filtering material is admitted into annular space 2 via a feeding device having a cone jacket-shaped baffle plate 24, which widens from the top downwardly and, jointly with the outer wall 4 of annular space 2, forms a narrow passage gap 25 at the lower end, Said cone jacket-shaped baffle plate 24, furthermore, covers the entire top side of annular space 2 in such a way that the particulate filtering material charged on baffle plate 24 in the center is fed into annular space 2 only near the its outer wall 4.

Such feed ensues the formation of a slope at the top end of the fill of the filter bed of particulate filtering material present in annular space 2, such slope being inclined from the outside inwardly. The particulate filtering material consists of a grain mixture with a grain spectrum comprising two or more grain sizes ranging from coarse grain (2.5 mm) to fine grain (0.4 mm). Said grain mixture demixes as the individual grains roll off across the slope of the fill, in a way such that the coarser grains come to rest within the zone of inner wall 3 of annular space 2, whereas the finer grains remain within the vicinity of the outer wall 4. This leads in the fill of the filter bed to a grain size of the filtering material that becomes smaller in the radial direction from the inside outwardlty. This grain size gradient positively influences the filtration process, as explained in greater detail in the introduction to the description.

FIGS. 2 and 3 show by a detailed side view and a detailed top view, respectively, a cutout of outer wall 4 of annular space 4. As shown, a support structure 14 is supported on the inner side of outer wall 4 which, similar to an egg carton, has a multitude of support cams spaced at regular intervals. A fine screen fabric 12 or a microfilter cloth rests on said support cams of support structure 14 from the inside. A multitude of drainage ducts 13 is formed between the outer wall 4 and the support structure 14, via which ducts the filtrate can flow off without obstruction. A stationary ring 26 secured on the inside of outer wall 4 serves for fixing screen fabric 12, with a movable clamping ring 27 being axially pressed against said ring 26. The two rings 26 and 27 fix screen fabric 12 between each other.

FIGS. 4 and 5 largely correspond with FIGS. 2 and 3, so that it was possible to use the same reference numerals for the individual components. However, the support structure 14 in FIGS. 4 and 5 has a wavy form in the way of a corrugated metal sheet and thus an enlarged surface area.

Figure 6:
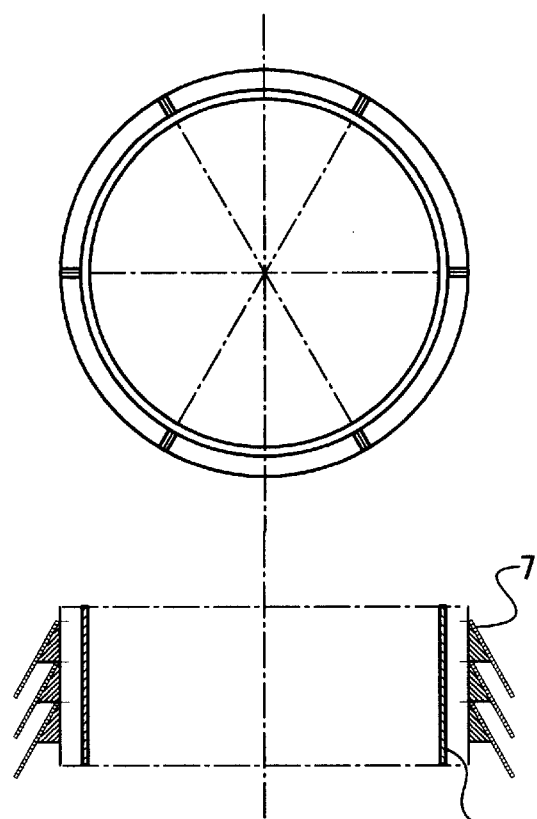
FIG. 6 shows a sectional view of an annular lamella.
Figure 7:
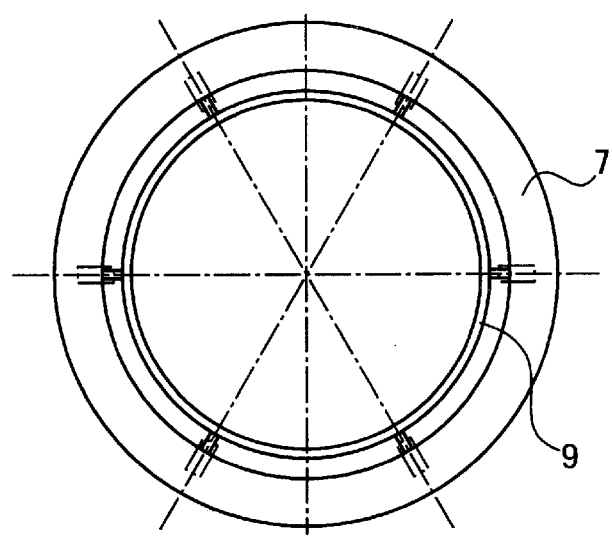
FIG. 7 shows a view of an annular lamella from the bottom.

FIGS. 6 and 7 show a sectional view and, respectively, a top view of one of the annular lamellae 7 from the bottom. Such lamellae are stacked one on top of the other in the form of a column, forming the inner wall 3 of annular space 2.

Figure 8:
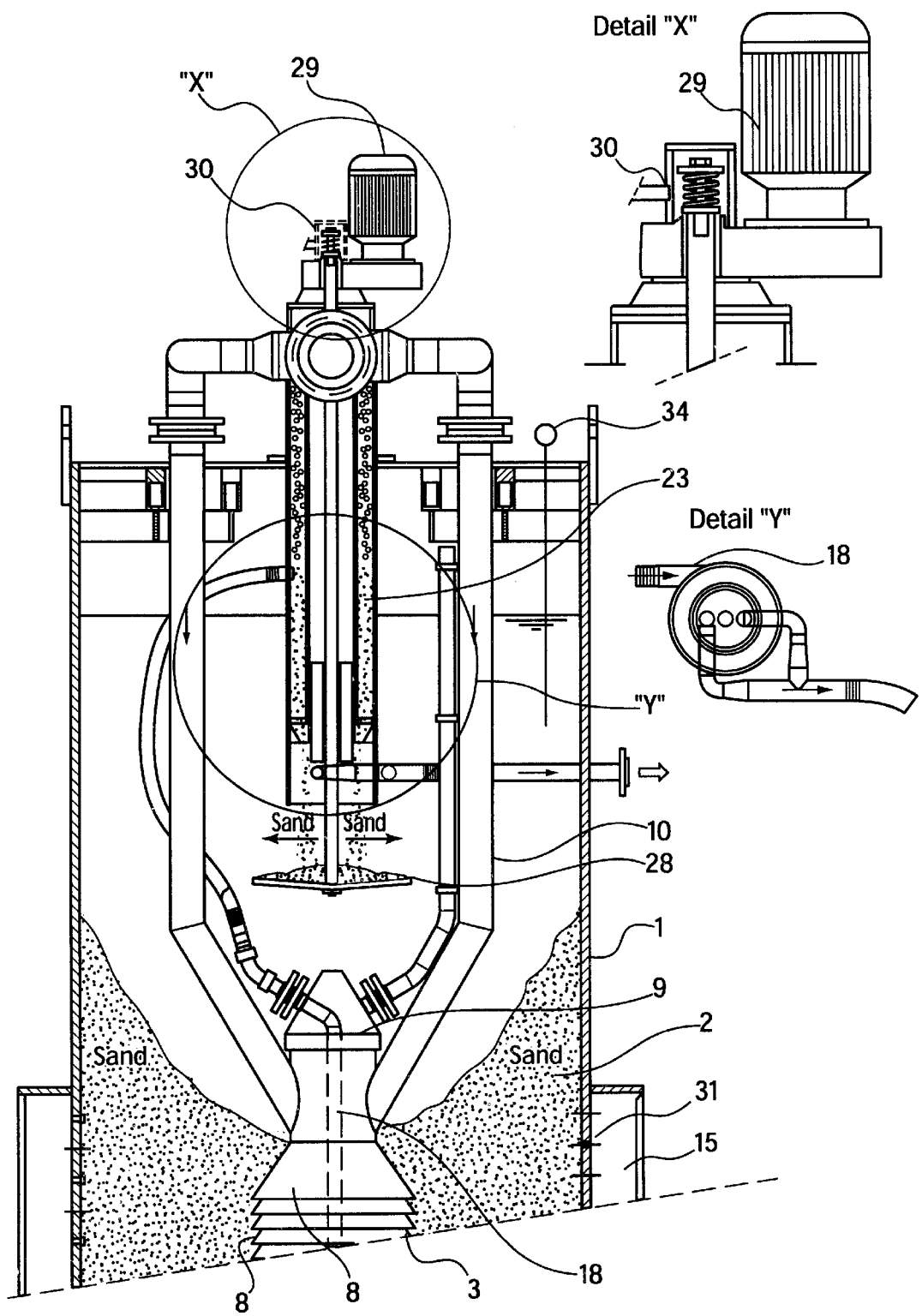
FIG. 8 is an alternative embodiment of the filter installation according to the invention shown schematically by a side view (only the upper zone).

FIG. 8 shows an alternative to baffle plate 24. In the present embodiment, a centrifugal dish 28 is arranged above annular space 2 and below upstream classifier 23, said centrifugal dish being rotatable about a vertical axle and driven by a drive motor 29. Said centrifugal dish 28 centrifuges the particulate filtering material impacting it in the outward direction up into the range of outer wall 4 of annular space 2, so that the slope extending inclined from the outside inwardly is obtained again at the upper end of the fill of the filter bed, as it is clearly shown in FIG. 8. In the same way as explained in the foregoing in connection with baffle plate 24, demixing of coarse grains and fine grains takes place on said slope, so that the gradient in grain size is obtained again in the fill of the filter bed as explained above. In addition, classification from coarse to fine takes place already in the course of the centrigugation process by suitably selecting the rotational speed. A switch 30 is associated with motor 29 of centrifugal dish 28. Said switch always starts the motor when the weight of the particulate material loading centrifugal dish 28 exceeds a defined amount. It is possible in this way to exactly meter the feed of particulate filtering material and to determine the amount conveyed.

Figure 9:
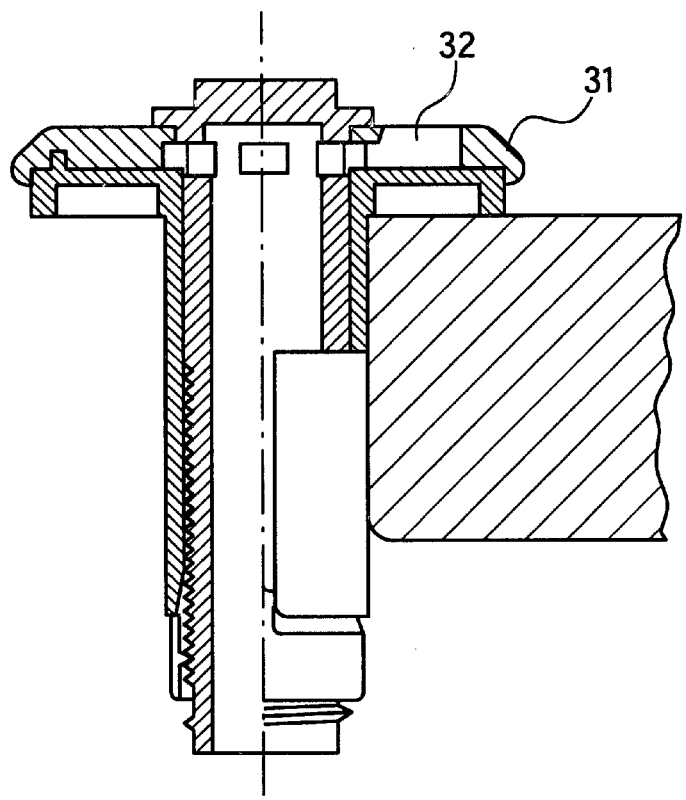
FIG. 9 is a sectional view of a filter nozzle.
Figure 11:
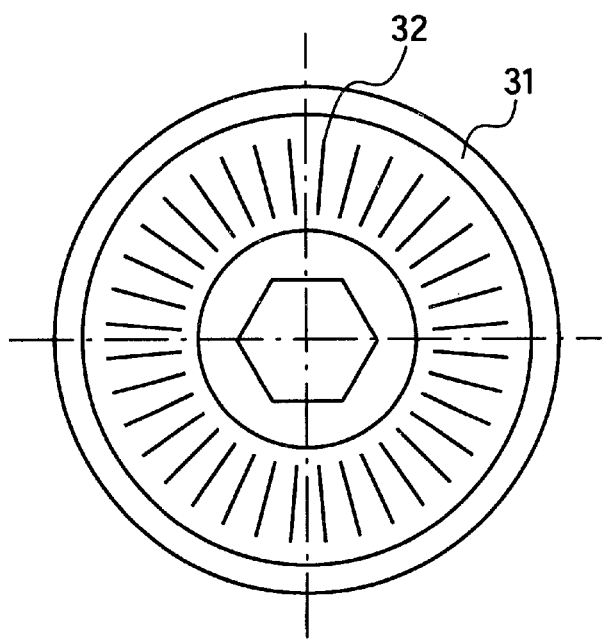
FIG. 11 is a view of the filter nozzle of FIG. 10 from the bottom.
Figure 10:
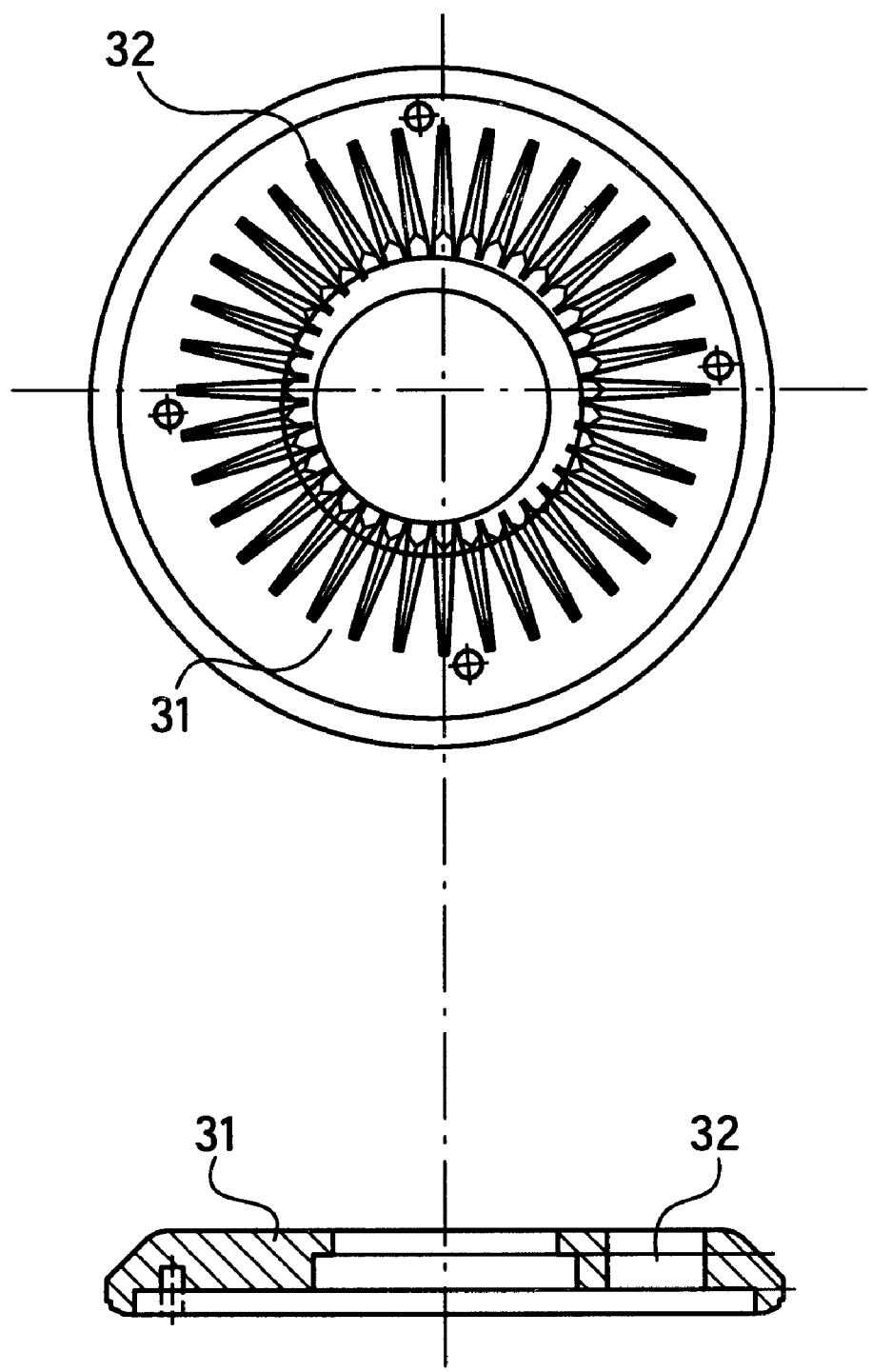
FIG. 10 is a view of the filter nozzle of FIG. 10 from the bottom.

FIG. 8, furthermore, shows that the outer wall 4 of annular space 2 is provided in the present embodiment with a multitude of breakthroughs, in which the filter nozzles 31 are inserted. Said filter nozzles 31 have microslits 32 extending in the form of a star and widening in the direction of flow-through. Such microslits reliably retain the particulate filtering material and are freed from the latter as the particulate filtering material is passing by, and said microslits are not clogged because of their special shape. The exact design of said filter nozzles is shown in FIGS. 9 to 11.

Figure 12:
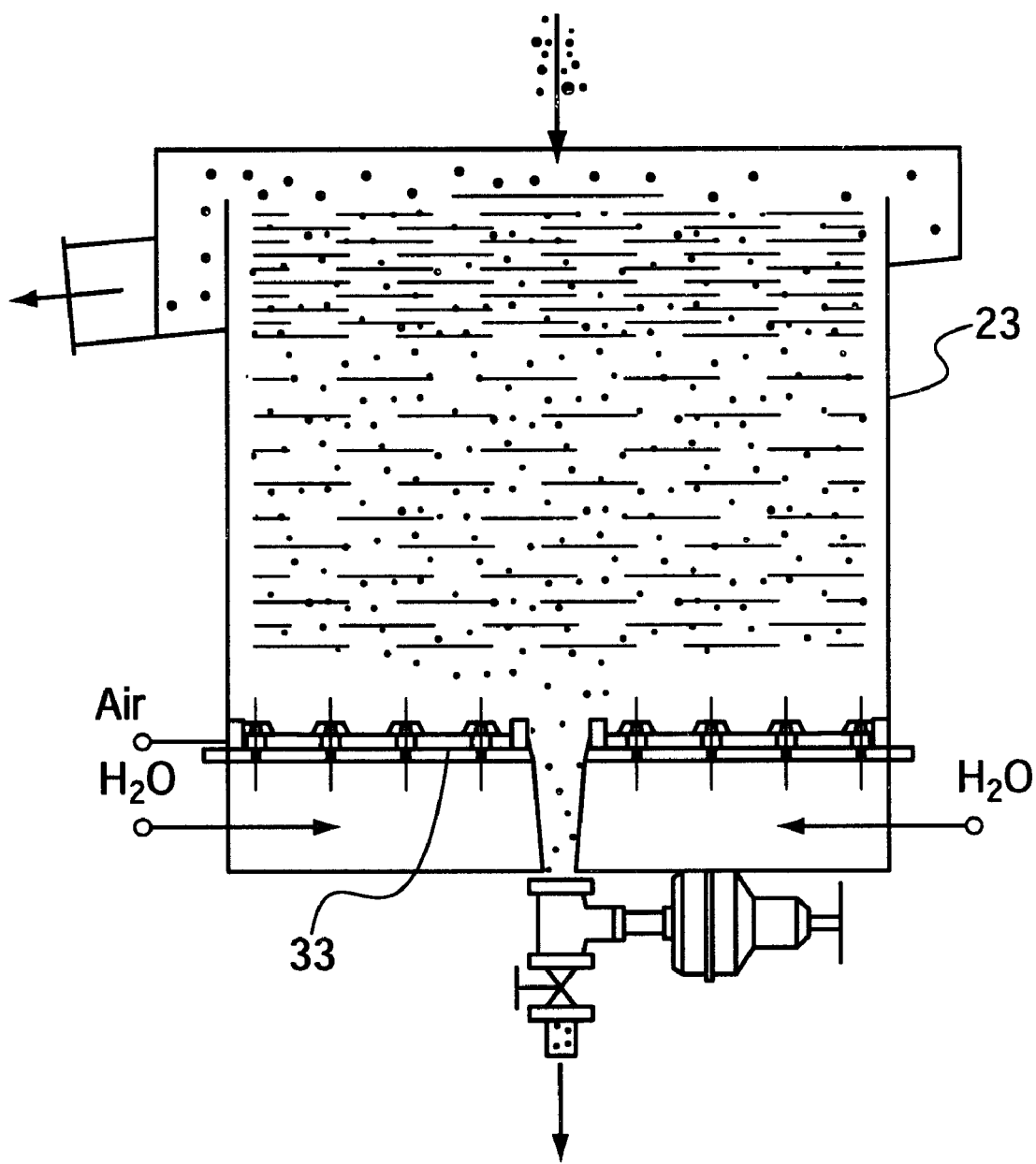
FIG. 12 is a schematic sectional view of an alternative design of the upstream classifier.

Finally, FIG. 12 shows an alternative design of the upstream classifier. The special feature of said upstream classier consists in that compressed air is fed into the ascending cleaning water via a porous foil 33 in the bottom of the upstream classifier. This type of air feed effects a particularly fine distribution of the air bubbles, so that the upstream classifier can operate with substantially less liquid. Said ascending air activates and intensifies the cleaning process.

What is claimed is:

1. Method for continuous filtration of fluids laden with solids, by means of a filter bed consisting of granular filter media, which is moved continuously through a vertically oriented cylindrical annular space (2), continuously flowed through by the fluid to be filtered in a radial direction,
whereby the granular filter media, laden with the filtered solids, is withdrawn continuously near the lower end of the annular space (2) and, freed of the filtered solids, returned to the annular space at its upper end,
whereby a granular media, consisting of two or several grain size distributions from coarse to fine, is used as filter media, this granular media being classified and distributed before and during its addition to the annular space (2) in such a way, that the grain sizes in the fill of the filter bed decrease in the flow direction of the fluid to be filtered, further characterized through the grain sizes decreasing in the fill of the filter bed in a radial direction from the inside to the outside, and the fluid to be filtered flowing through the filter bed in a radial direction from the inside to the outside with decreasing velocities;

further characterized in that the annular space (2) is vertically oriented and cylindrical and surrounded by an outer wall (4) an d limited by an inner wall (3) both inner and outer wall being permeable to liquid.

2. Method as claimed in claim 1, characterized through an additional filtration of the fluid to be filtered in the vicinity of the outer wall (4) of the annular space containing the filter bed, by means of a fine sieve material (12) or by means of filter nozzles (31).

3. Method as claimed in claim 1, characterized in that coarser and heavier solid particles of the fluid to be filtered are removed in a deflection chamber (11) by means of an 180° reversal before the fluid is introduced to the filter bed.

4. Apparatus for the continuous filtration of fluids laden with solids, having the following characteristics:

a cylindrical container (1) having a vertically oriented cylindrical annular space (2) for the granular filter media, wherein the annular space (2) is vertically oriented and cylindrical and surrounded by an outer wall (4) and limited by an inner wall (3) both inner and outer wall being permeable to liquid, and a withdrawal means for the granular filter media laden with solids, located at the lower end of said annular space (2) and including a suction head (19), an airlift whose transport pipe (18) extends from said withdrawal means to the upper end of said annular space (2), a cleaning means for the granular filter media, located between the upper discharge end of said transport pipe (18) and the upper end of said annular space (2)

an introduction means (24, 28) located between said cleaning means and the upper end of said annular space (2) to return the cleaned granular fill material back to said annular space (2) in the vicinity of said outer wall (4), characterized through a conduit for the fluid to be filtered (9), located between the inner wall (3) and the airlift pipe (18), providing at its upper end a connection means (10) for the fluid to be filtered, and in connection at its lower end with a deflection chamber (11), where the fluid to be filtered is reversed from a descending flow direction into a rising flow direction and is introduced into the annular gap between said transport pipe (9) and the permeable inner wall (3), whereby said deflection chamber (11) is equipped with a sludge withdrawal means, which is in connection with the suction head (19) of said airlift.

5. Apparatus as claimed in claim 4, characterized in that said permeable outer wall (4) is covered on its inner side by a fine mesh sieve material (12), placed on a support structure (14) having drainage channels (13).

6. Apparatus as claimed in claim 17, characterized in that said permeable outer wall contains filter nozzles (31) inserted in wall openings, having micro slits (32) arranged in a star-shaped pattern.

7. Apparatus as claimed in claim 4, characterized in that said cleaning means is configured as a hydraulic classifier (23), equipped with a fine bubble aeration means (33) at its bottom.

* * * * *